United States Patent
Yoshino

(10) Patent No.: US 7,456,600 B1
(45) Date of Patent: Nov. 25, 2008

(54) PULSE CODE WIDTH MODULATION MOTOR DRIVE SYSTEM

(75) Inventor: Hozo Yoshino, Tokyo (JP)

(73) Assignee: System Homes Company, Ltd., Tokyo (JP)

( * ) Notice: Subject to any disclaimer, the term of this patent is extended or adjusted under 35 U.S.C. 154(b) by 0 days.

(21) Appl. No.: 12/145,306

(22) Filed: Jun. 24, 2008

(51) Int. Cl.
*H02P 1/24* (2006.01)

(52) U.S. Cl. .................. 318/727; 318/567; 318/729; 318/800; 318/801

(58) Field of Classification Search .............. 318/727, 318/567, 729, 800, 801, 802, 803, 811, 812
See application file for complete search history.

(56) References Cited

U.S. PATENT DOCUMENTS

| | | | |
|---|---|---|---|
| 4,409,534 A | 10/1983 | Bose | |
| 4,634,952 A | 1/1987 | Yoshino et al. | |
| 5,420,778 A | 5/1995 | Yoshino | |
| 2007/0230648 A1 * | 10/2007 | Gupta et al. | 375/371 |

FOREIGN PATENT DOCUMENTS

| | | |
|---|---|---|
| JP | 56010090 A | 2/1981 |
| JP | 60074996 A | 4/1985 |
| JP | 62236380 A | 10/1987 |
| JP | 3056093 A | 3/1991 |
| JP | 3164095 A | 7/1991 |
| JP | 7023593 A | 1/1995 |
| JP | 8331893 A | 12/1996 |
| JP | 11018436 A | 1/1999 |
| JP | 2006109688 A | 4/2006 |
| JP | 2007295647 A | 11/2007 |

* cited by examiner

*Primary Examiner*—Karen Masih
(74) *Attorney, Agent, or Firm*—Aaron D. Barker; Stoel Rives, LLP

(57) ABSTRACT

A detailed architectural and operational characteristic of a pulse code width modulation (PCWM) motor drive system is presented. The system can drive a three phase permanent magnet AC (PMAC) motor sinusoidally without sensing its rotor position. The system employs an ultrasonic carrier frequency (e.g., of approximately 20 kHz) to avoid annoying acoustic noise problems. While keeping the hardware construction at a minimum, it can provide the highest possible motor performance by satisfying various motor operating requirements. The system may include an AC to DC converter, an application specific integrated circuit (ASIC), a DC to DC step-down chopper, and a gate drive and power transistor circuitry to drive a three phase AC motor.

19 Claims, 14 Drawing Sheets

Unit Sine Function Table

| Table Position # | Unit Sine Function | Unit Sine Function Decimal Numbers | Unit Sine Function Numeric (Hexa #) |
|---|---|---|---|
| n=1 | 127sin (0.250) | 0.55414 | h01 |
| n=2 | 127sin (0.250+0.50) | 1.66238 | h02 |
| n=3 | 127sin (0.250+1.00) | 2.77049 | h03 |
| n=4 | 127sin (0.250+1.50) | 3.87839 | h04 |
| n=180 | 127sin (0.250+89.50) | 126.99879 | h7f |
| n=181 | 127sin (0.250+90.00) | 126.99879 | h7f |
| n=360 | 127sin (0.250+179.50) | 0.55414 | h01 |
| n=361 | 127sin (0.250+180.00) | -0.55414 | hfe |
| n=539 | 127sin (0.250+269.50) | -126.99879 | h80 |
| n=540 | 127sin (0.250+270.00) | -126.99879 | h80 |
| n=717 | 127sin (0.250+358.00) | -3.87839 | hfb |
| n=718 | 127sin (0.250+358.50) | -2.77049 | hfc |
| n=719 | 127sin (0.250+359.00) | -1.66238 | hfd |
| n=720 | 127sin (0.250+359.50) | -0.55414 | hfe |

\* Negative decimal numbers (n=361-720) are converted to the hexa integer in one's complements.

*FIG. 3*

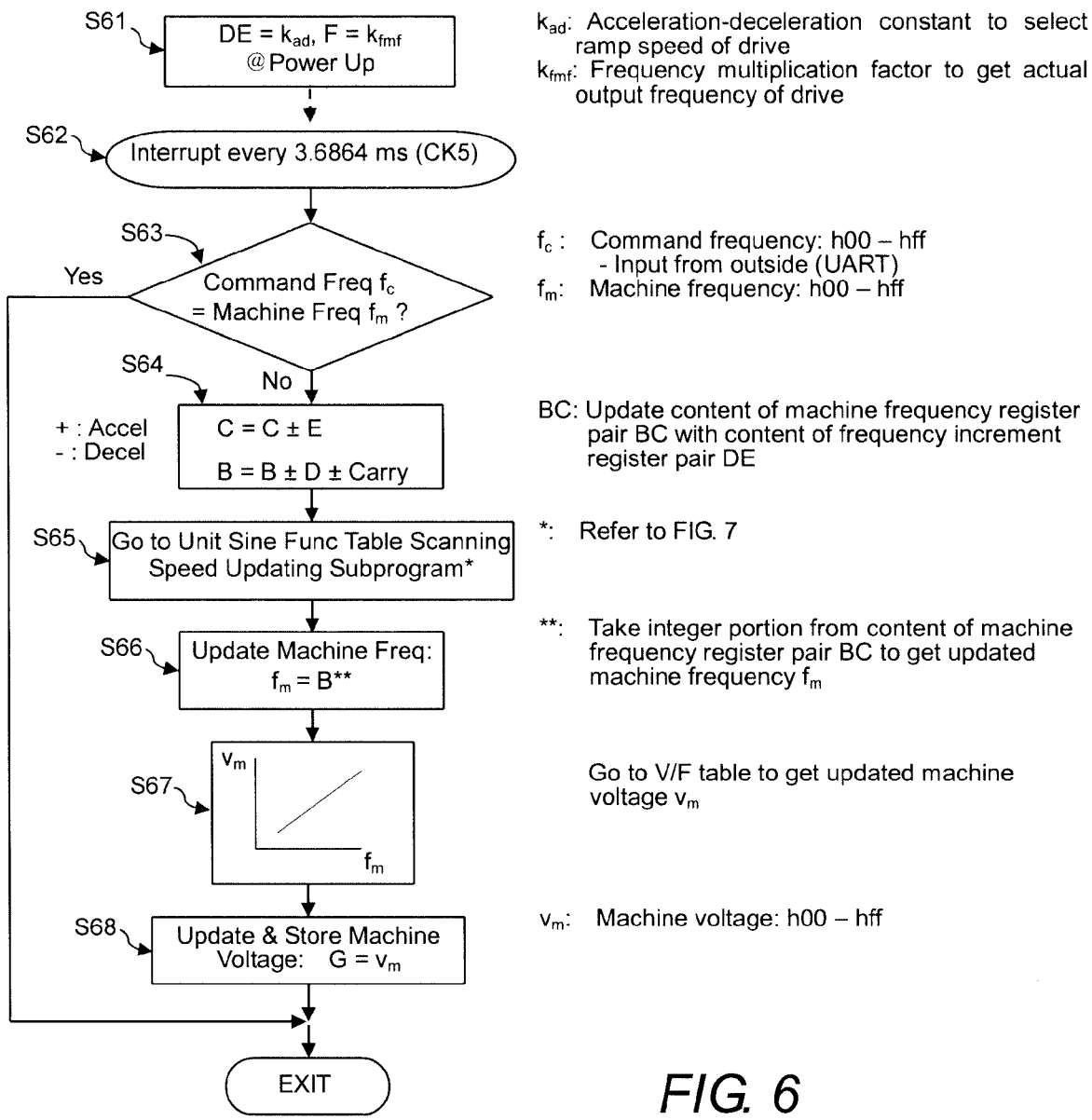
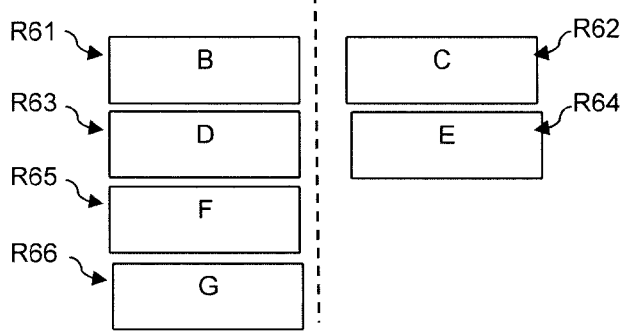
FIG. 6

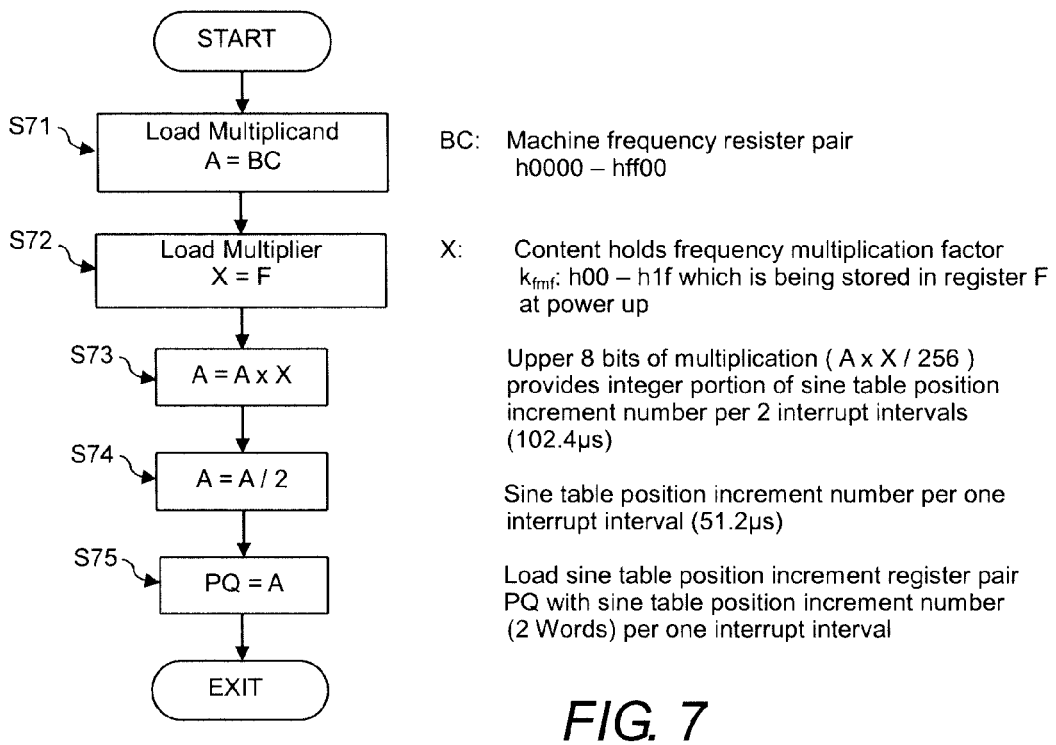
FIG. 7
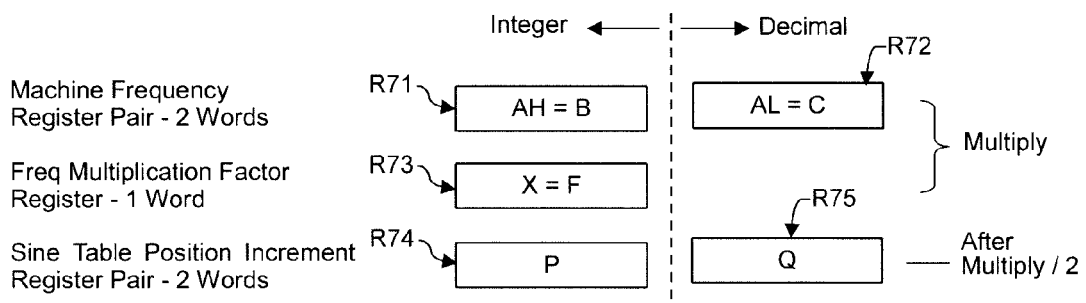

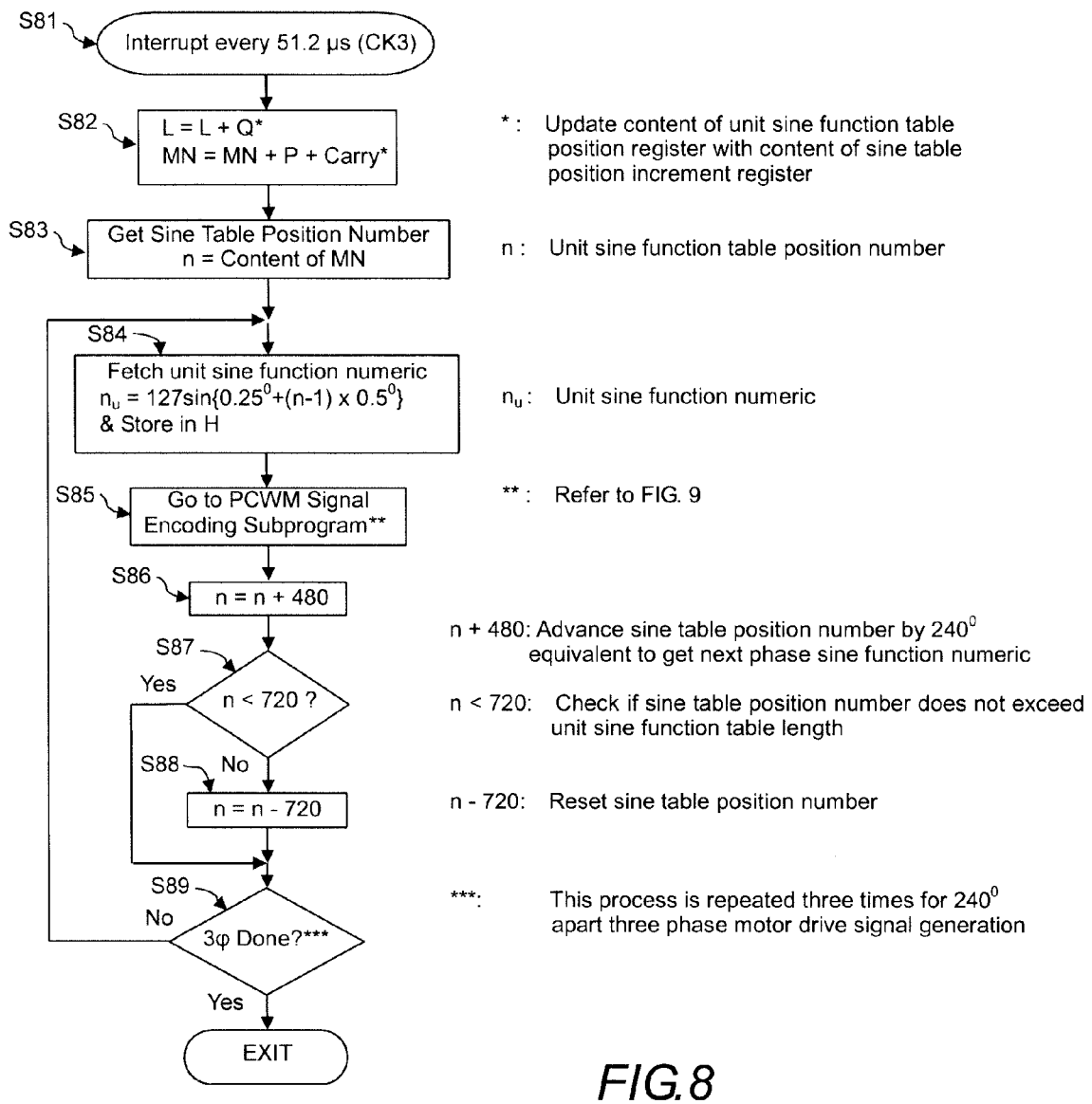
*FIG. 8*
SINE FUNCTION TABLE POSITION REGISTER ARRANGEMENT
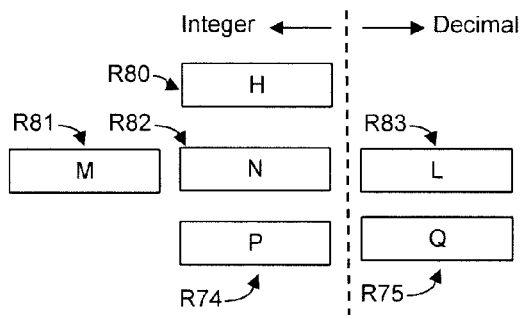

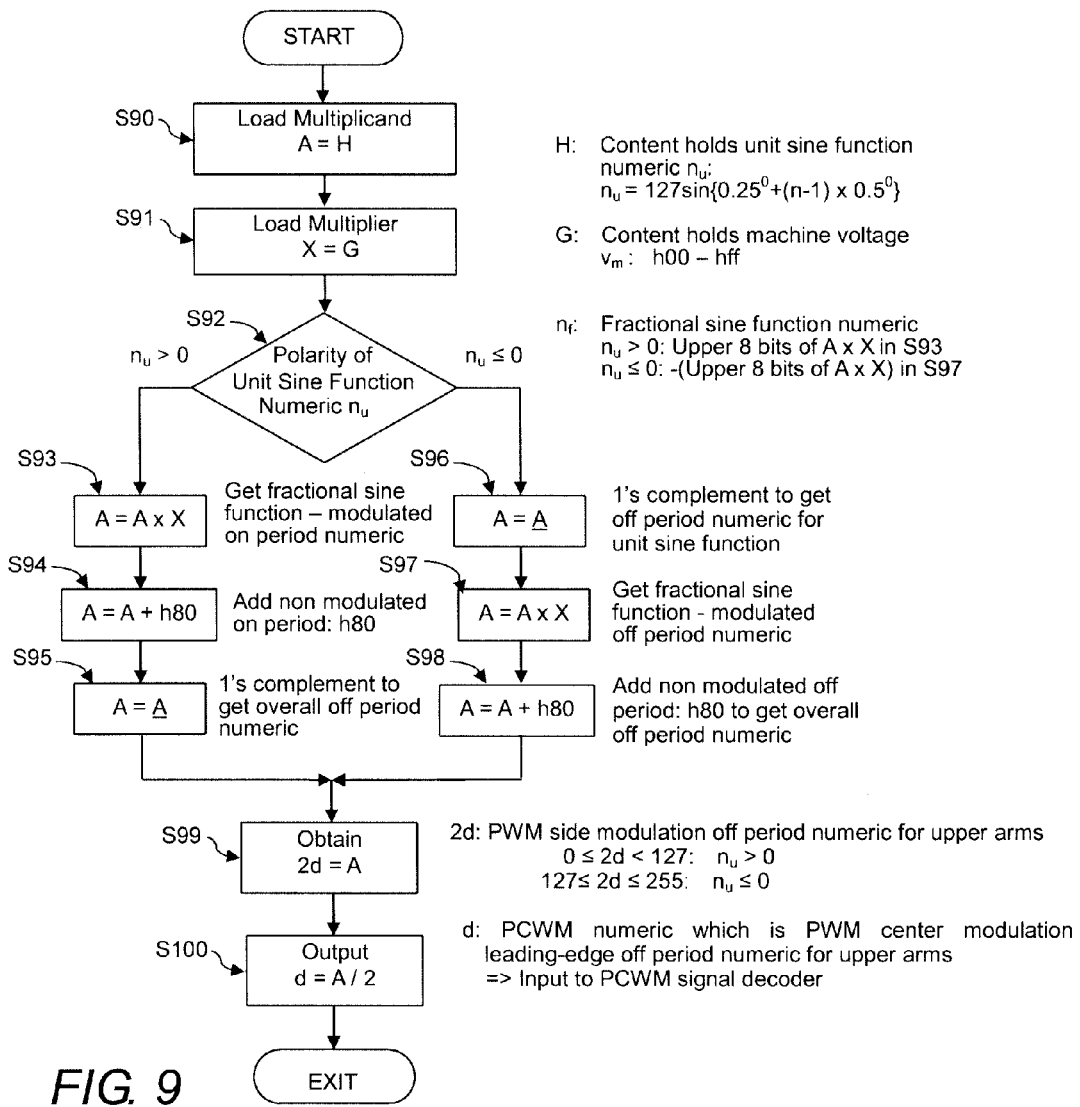
FIG. 9
VOLTAGE MULTIPLICATION REGISTER ARRANGEMENT
Unit Sine Function Holding Register H - 1 Word
Machine Voltage Holding Register G - 1 Word
Fractional Sine Function Holding Register A
— Upper 8 bits of multiplication holds absolute number of fractional sine function $n_f$
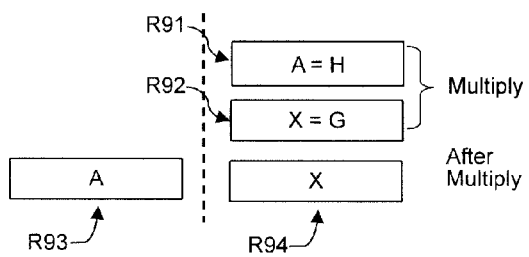

**Unit Sine Function Numeric $n_u > 0$
Machine Voltage $v_m$ = h80 (128)**

S90:
Output from unit
sine function
table
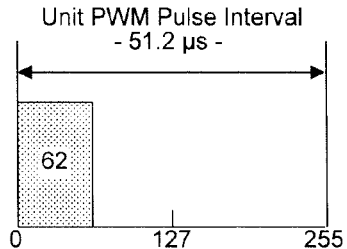

S93:
After multiply volt
& take upper 8 bits
to get fractional
mod on period
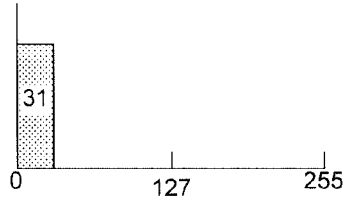

S94:
After adding h80
to get overall
on period
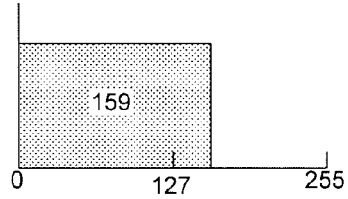

S95:
Take 1's
complement
to get overall
off period
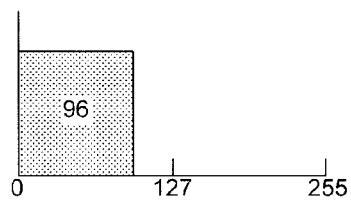

S100:
After dividing
by 2 for center
mod off period
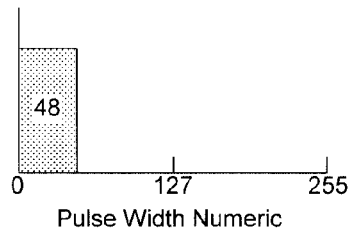

Pulse Width Numeric

**Unit Sine Function Numeric $n_u \leq 0$
Machine Voltage $v_m$ = h80 (128)**

S90:
Output from unit
sine function
table
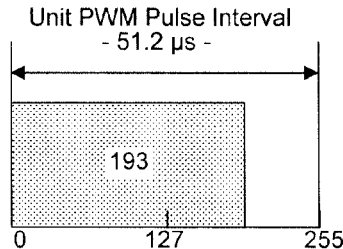

S96:
Take 1's
complement
to get off period
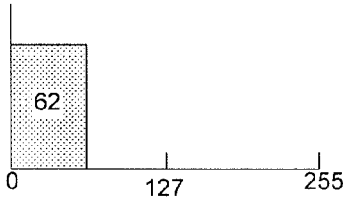

S97:
After multiply volt
& take upper 8 bits
to get fractional
mod off period
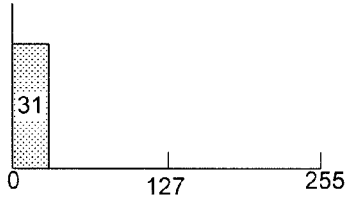

S98:
After adding h80
to get overall
off period
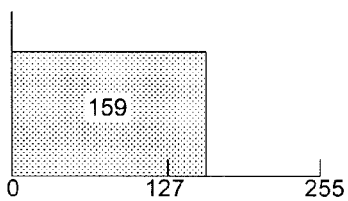

S100:
After dividing
by 2 for center
mod off period
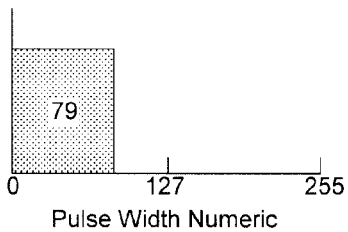

Pulse Width Numeric

*FIG. 10*

PULSE CODE WIDTH MODULATION MOTOR DRIVE SYSTEM

TECHNICAL FIELD

The present disclosure relates to a variable speed motor drive system, and more particularly, to a variable speed drive system employing a pulse code width modulation (PCWM) technology to be applied to drive a three phase AC motor sinusoidally without measuring the rotor position.

DESCRIPTION OF THE PRIOR ART

U.S. Pat. No. 4,634,952, entitled, "Inverter," granted to Yoshino et al. (the '952 patent), describes sinusoidal motor drive signal generation by a coding method similar to one employed by Pulse Code Modulation (PCM) in a digital communication technology. However there are several shortcomings in what the '952 patent discloses. First, the '952 patent employs a Random Access Memory (RAM) to temporarily store the coded sinusoidal signals for the entire one signal cycle on a quasi-real time basis for the next signal output cycle. It therefore cannot alter the frequency or voltage level during the current entire signal output cycle.

Secondly, although the '952 patent describes a capability to select a voltage level within the V/F envelope, it does not provide information on how to select a desired voltage level, nor does it provide any means to measure the load level of the motor. Thirdly, the '952 patent employs a synchronous signal and carrier frequency. Namely the carrier frequency range is 0.94 kHz to 1.52 kHz, which is proportional to the signal frequency range. In order to select a certain output signal frequency, the '952 patent employs a complicated variable step-down counter of the basic clock frequency of 6 kHz.

Fourthly, the '952 patent does not describe how to record the negative unit sine function in the Read-Only Memory (ROM). Fifthly, there needs to be at least three hardware chips, two microcomputers for encoding a sine function and one gate array to decode the coded sine function, for the system construction taught by the '952 patent.

U.S. Pat. No. 5,420,778, entitled, "Independent Real Time Control of Output Frequency and Voltage of PWM Inverter," granted to Yoshino (the '778 patent) also describes a coding method to generate an output PWM signal for motor drive. An objective of the '778 patent is an active control of an inverter output voltage using an inverter output current as the feedback signal. There is no disclosure in the '778 patent, however, describing how to mechanize the PWM signal encoder and PWM signal decoder. Moreover, there is no description at all in the '778 patent about the memories needed for the output signal waveform generation and the baseline voltage to frequency function table, or how to calculate the required output using these recorded data.

SUMMARY OF THE DISCLOSURE

This disclosure provides a detailed architecture of PCWM technology that includes open loop control of a permanent magnet AC (PMAC) motor for, e.g., fan and compressor applications. The load level of these applications typically is known a priori. Therefore, one embodiment defines the voltage to frequency characteristic as a fixed function of the motor speed for system simplicity.

One feature of certain embodiments is a real time calculation capability of updating an output sine function phase angle and the associated output width of the PWM signal (i.e. output voltage) every constant carrier interval of approximately 51.2 µs through use of finite state machine technology. This feature enables employment of a sinusoidal motor drive waveform with an ultrasonic carrier frequency of approximately 20 kHz (=1/51.2 µs) to avoid annoying acoustic noise problems. The concept is realized by drawing a fractional sine function circle in which an instantaneous amplitude of the fractional sine function relates directly to a pulse width numeric in a unit PWM pulse interval for the motor drive output. The real time calculation procedure is described in detail for one embodiment using a unit sine function table and a voltage to frequency (V/F) function table.

Another feature of certain embodiments is a calculation capability of carrying decimal numbers using double precision registers, thereby increasing the motor drive stability with a finer speed control.

Yet another feature of certain embodiments is a capability of accepting the maximum output frequency and the ramp speed options from outside through a single serial communication line, thereby widening the applicability of the associated application specific integrated circuit (ASIC) to various motor drive applications.

A further feature of certain embodiments is an employment of a center modulation PWM signal which creates a power transistors' inter-conduction twice per each unit PWM pulse interval compared to once for a side modulation PWM signal, allowing a finer current wave form resulting in smoother motor drive.

A still further feature of certain embodiments is the compactness of the associated hardware. The ASIC can incorporate the unit sine function table, V/F table, a clock generator, a PCWM signal encoder, and a PCWM signal decoder in one chip employing a small outline package (SOP).

Additional aspects and advantages will be apparent from the following detailed description of preferred embodiments, which proceeds with reference to the accompanying drawings.

BRIEF DESCRIPTION OF THE DRAWINGS

FIG. 3 is a unit sine function table referred to by the PCWM signal encoder when obtaining a unit sine function numeric by inputting a unit sine function table position number according to one embodiment;

FIG. 6 is a flow chart of a subprogram showing how a machine frequency and a machine voltage are updated every CK5 interrupt period (approximately 3.6864 ms) according to one embodiment;

FIG. 7 is a unit sine function table scanning speed updating subprogram working with the subprogram in FIG. 6 according to one embodiment;

FIG. 8 is a flow chart of a subprogram showing how a unit sine function table position number is updated every CK3 interrupt period (approximately 51.2 µs) according to one embodiment;

FIG. 9 is a PCWM signal encoding subprogram working with the subprogram in FIG. 8 in which a center modulation off period numeric is updated according to one embodiment;

FIG. 10 is a time chart illustrating how PCWM numerics generated in the PCWM signal encoder are converted into a pulse width numeric in the unit PWM pulse interval in a PWM signal decoder according to one embodiment;

DETAILED DESCRIPTION OF PREFERRED EMBODIMENTS

A detailed architectural and operational characteristic of a pulse code width modulation (PCWM) motor drive system is presented. The system can drive a three phase permanent magnet AC (PMAC) motor sinusoidally without sensing its rotor position. The system employs an ultrasonic carrier frequency of approximately 20 kHz to avoid acoustic noise problems. While keeping the hardware construction minimum, it can provide the highest possible motor performance and satisfy various motor operating requirements.

Figure 1:
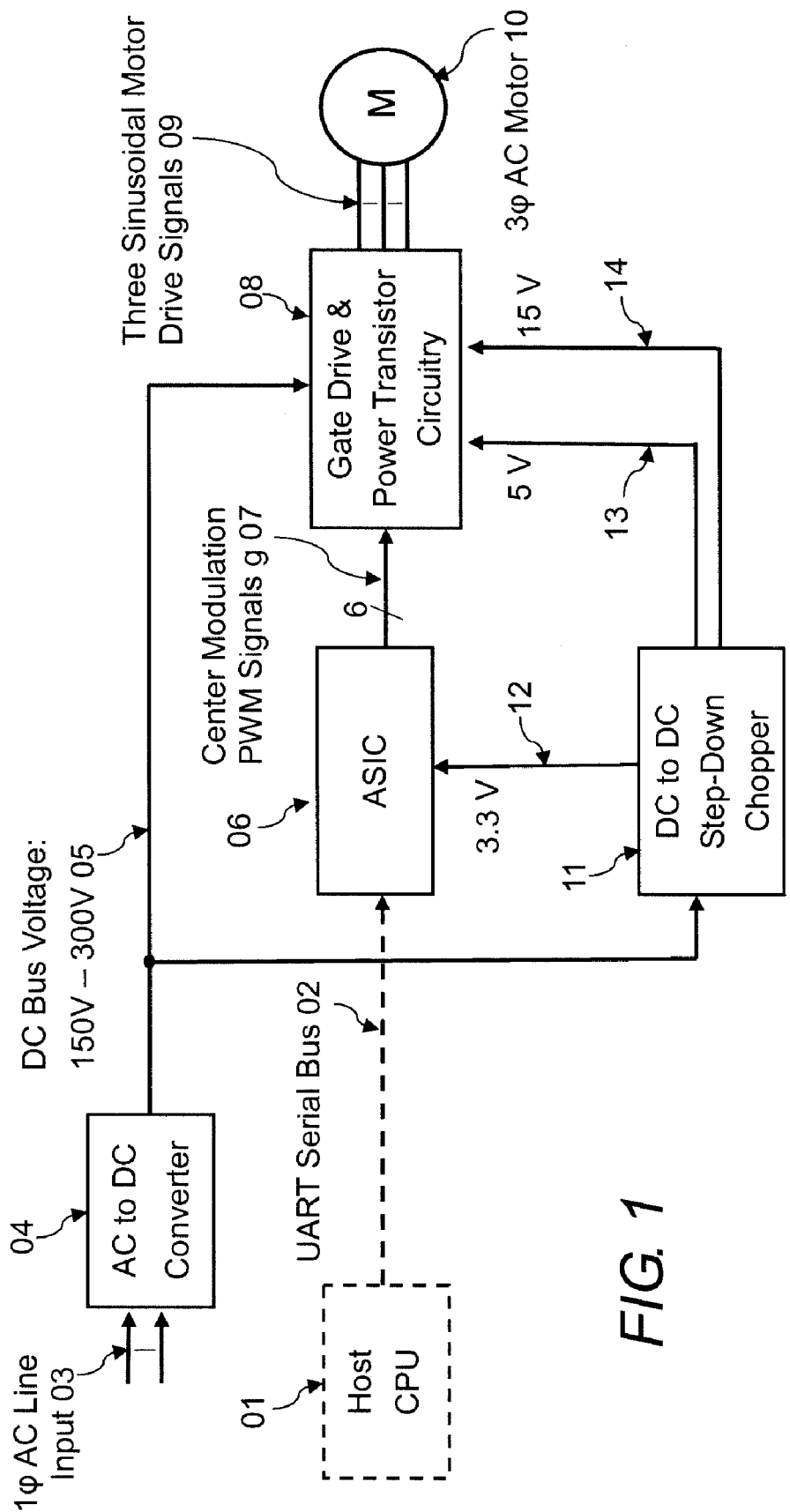
FIG. 1 is a block diagram showing an embodiment of a motor drive system according to one embodiment.

An embodiment is explained by referring to FIG. 1. An external host CPU 01 is connected to an ASIC 06 via a UART serial bus 02. A single phase AC line input 03 is connected to an AC to DC converter 04, of which input is then converted to a DC bus voltage 05 of approximately 150 vdc to approximately 300 vdc dependent on the system requirement. The ASIC 06 with the input from the UART serial bus 02 performs real time arithmetic operations and outputs gate drive input signals g 07 to a gate drive and power transistor circuitry 08. The gate drive and power transistor circuitry 08 then outputs three sinusoidal motor drive signals 09 to drive a three phase AC motor 10. The DC bus voltage 05 is provided to a DC to DC step-down chopper 11 and the gate drive and power transistor circuitry 08. The DC to DC step-down chopper 11 produces an approximately 3.3 vdc 12 for a power supply of the ASIC 06 and an approximately 5 vdc 13 and an approximately 15 vdc 14 for a power supply of the gate drive and power transistor circuitry 08.

Figure 2:
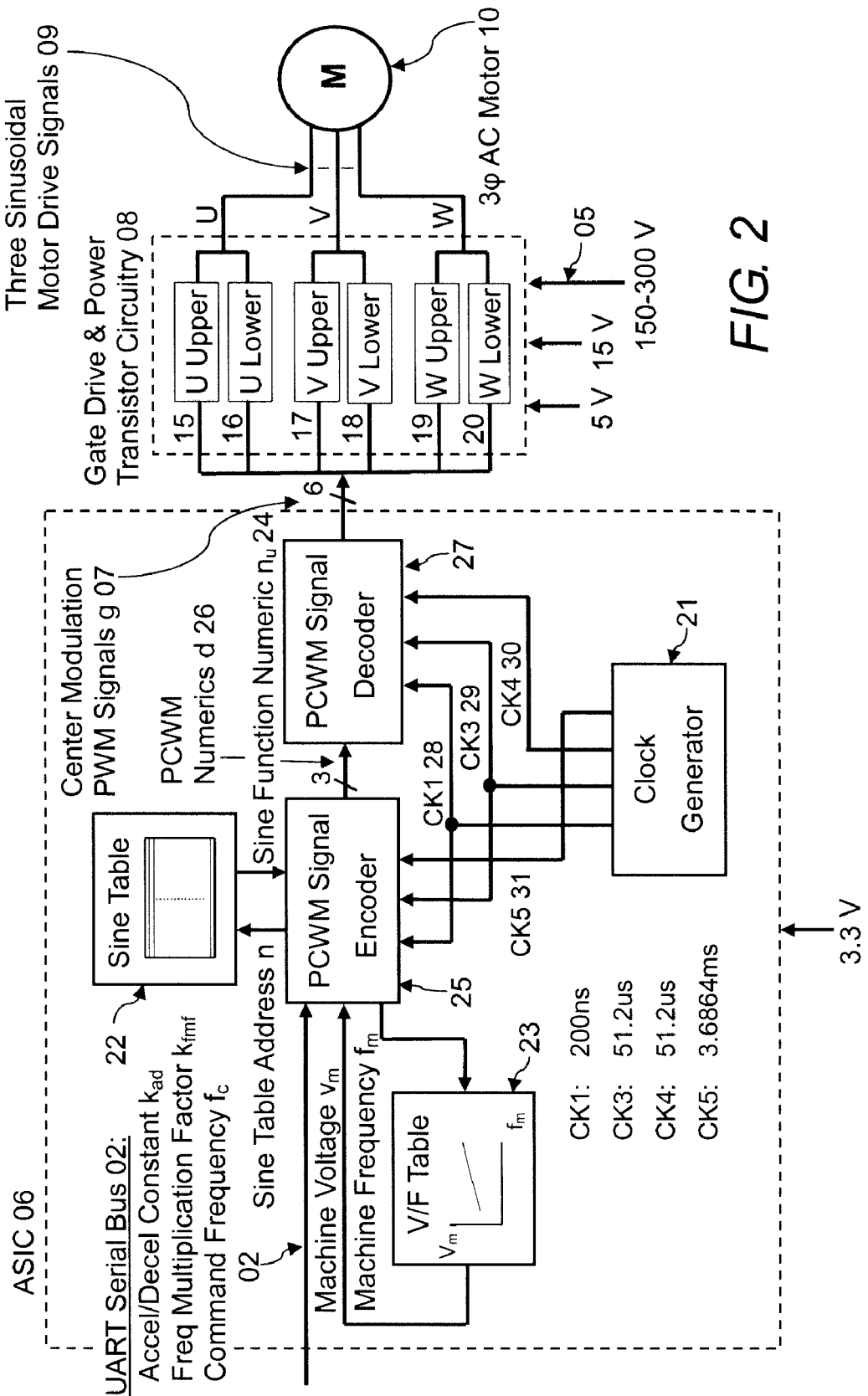
FIG. 2 is a block diagram showing the detailed inside embodiment of an ASIC and a gate drive and power transistor circuitry according to one embodiment.

FIG. 2 is a block diagram showing the detailed inside embodiment of the ASIC 06 and the gate drive and power transistor circuitry 08 according to one embodiment. The ASIC 06 receives its input signal via the UART serial bus 02. An acceleration-deceleration constant $k_{ad}$ and a frequency multiplication factor $k_{fmf}$ are input to the ASIC 06 upon a power up. After the power up, a command frequency $f_c$ is input to the ASIC 06 as an alternate input.

A clock generator 21 located inside the ASIC 06 working on a baseline frequency crystal oscillator of approximately 10 MHz provides various frequency clock pulses. A CK1 28 with the repetition period of approximately 200 ns is provided to a PCWM signal encoder 25 and a PCWM signal decoder 27. A CK3 29 with the repetition period of approximately 51.2 μs is provided to the PCWM signal encoder 25 and the PCWM signal decoder 27. A CK4 30 with the repetition period of approximately 51.2 μs is provided to the PCWM signal decoder 27. A CK5 31 with the repetition period of approximately 3.6864 ms is provided to the PCWM signal encoder 25.

A unit sine function table 22, which is located inside the ASIC 06 and includes a set of maximum amplitude sine functions, outputs a unit sine function numeric $n_u$ 24 back to the PCWM signal encoder 25 after receiving a unit sine function table position number n from the PCWM signal encoder 25. A frequency to voltage (V/F) function table 23 is located inside the ASIC 06 and outputs a machine voltage $v_m$ back to the PCWM signal encoder 25 after receiving a machine frequency $f_m$ from the PCWM signal encoder 25.

The PCWM signal encoder 25 is located inside the ASIC 06 and includes a finite state machine which is operational on the CK1 28 clock. The PCWM signal encoder 25 updates the machine frequency $f_m$ and the machine voltage $v_m$ every CK5 31 interrupt period based on the acceleration-deceleration constant $k_{ad}$ previously supplied at the power up and a command frequency $f_c$ supplied after the power up both via the UART serial bus 02. The PCWM signal encoder 25 also provides PCWM numerics d 26 to the PCWM signal decoder 27 based on the updated unit sine function numeric $n_u$ 24 corresponding to the machine frequency $f_m$ and the machine voltage $v_m$ and the frequency multiplication factor $k_{fmf}$ supplied via the UART serial bus 02 at the power up every CK3 29 interrupt period.

The PCWM signal decoder 27 is located inside the ASIC 06 and comprises (see FIG. 12) a serially connected D flip-flop 32, a 7-bit up-counter 34, and a toggle flip-flop 36 which are operational on the CK1 28 clock. The PCWM signal decoder 27 outputs center modulation PWM signals g 07 to the gate drive and power transistor circuitry 08 based on the PCWM numerics d 26 input from the PCWM signal encoder 25 every CK3 29 interrupt period.

The gate drive and power transistor circuitry 08, which comprises U upper 15 and U lower 16 arms, V upper 17 and V lower 18 arms, and W upper 19 and W lower 20 arms, each connected in tandem to modulate the DC bus voltage 05 corresponding to the center modulation PWM signals g 07 output from the PCWM signal decoder 27, thereby applying three sinusoidal motor drive signals 09 U, V, and W to a three phase AC motor 10.

FIG. 3 is a unit sine function table referred to by the PCWM signal encoder 25 in obtaining a unit sine function numeric $n_u$, which is a hexa number, by inputting a unit sine function table position number n according to one embodiment.

Figure 4:
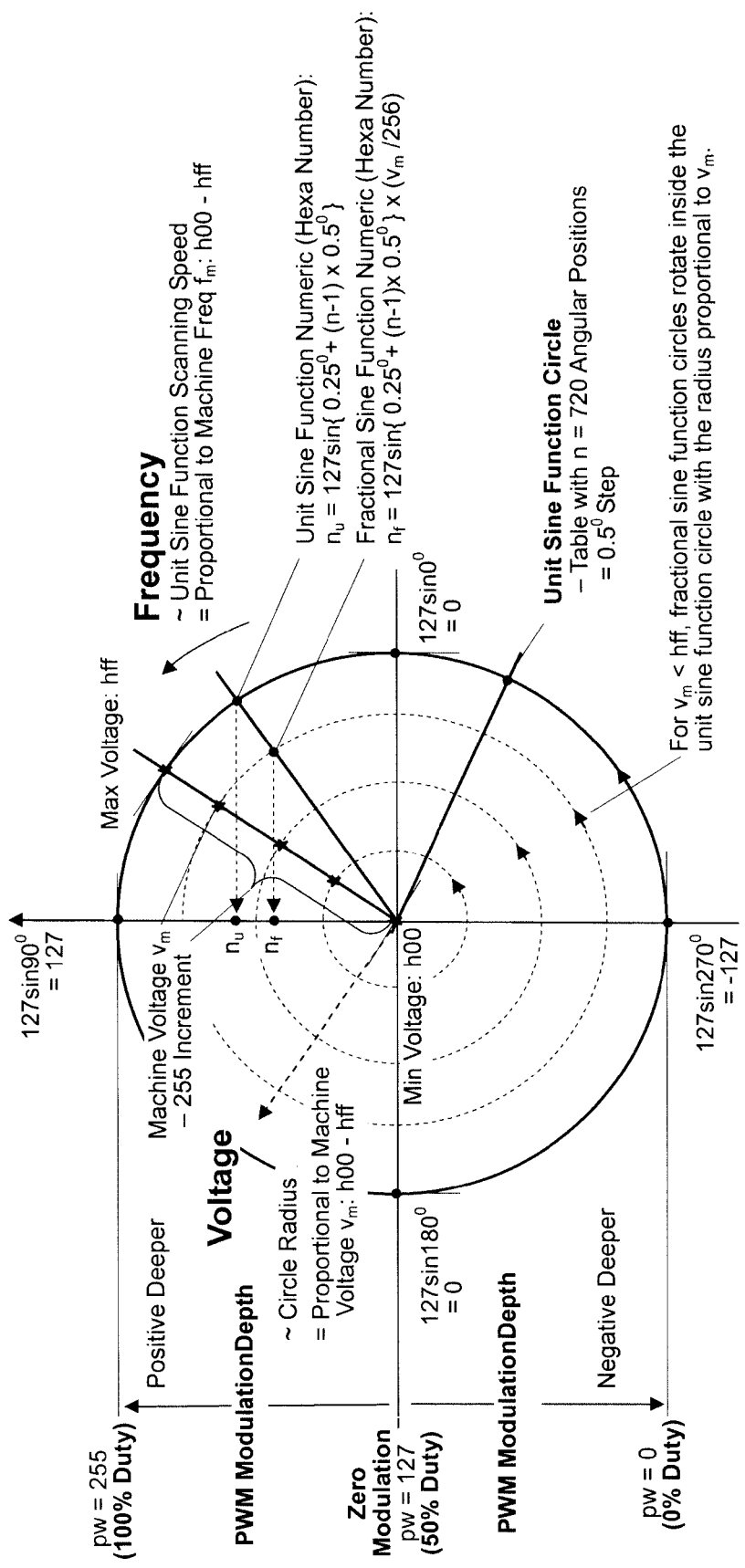
FIG. 4 is an illustration showing a relation between the instantaneous amplitude of the fractional sine function and the pulse width numeric in the unit PWM pulse interval according to one embodiment.

FIG. 4 is an illustration how the instantaneous amplitude of the fractional sine function numeric $n_f$ can be translated into the pulse width numeric pw in the unit PWM pulse interval having 255 discrete positions according to one embodiment. The unit sine function circle represents a circle with the maximum radius of 127. There are some 720 radial lines originating from the center of the circle and 0.5 degrees apart, each representing different unit sine function phase angles. There are some 255 equal or smaller radius circles on or inside the unit sine function circle, each representing different voltage level. Mathematically, therefore, there are some 720× 255 cross points on which a digital machine can take the position.

Output frequency of the three sinusoidal motor drive signals 09 is proportional to the unit sine function scanning speed, which is a function of the machine frequency $f_m$ times the frequency multiplication factor $k_{fmf}$. Output voltage of the three sinusoidal motor drive signals 09 is proportional to the fractional sine function radius which is on or inside the unit sine function circle. It is noted that when the three phase AC motor 10 starts to rotate after the power up, the corresponding rotating circle of the fractional sine function originates with the slowest rotational speed at the smallest radius near the center of the circle. Then the rotating circle moves to the outer trajectory with an accelerating speed. Finally, when the three phase AC motor 10 gets to the maximum speed, the rotating circle reaches the unit sine function circle with the top rotational speed.

Figure 5:
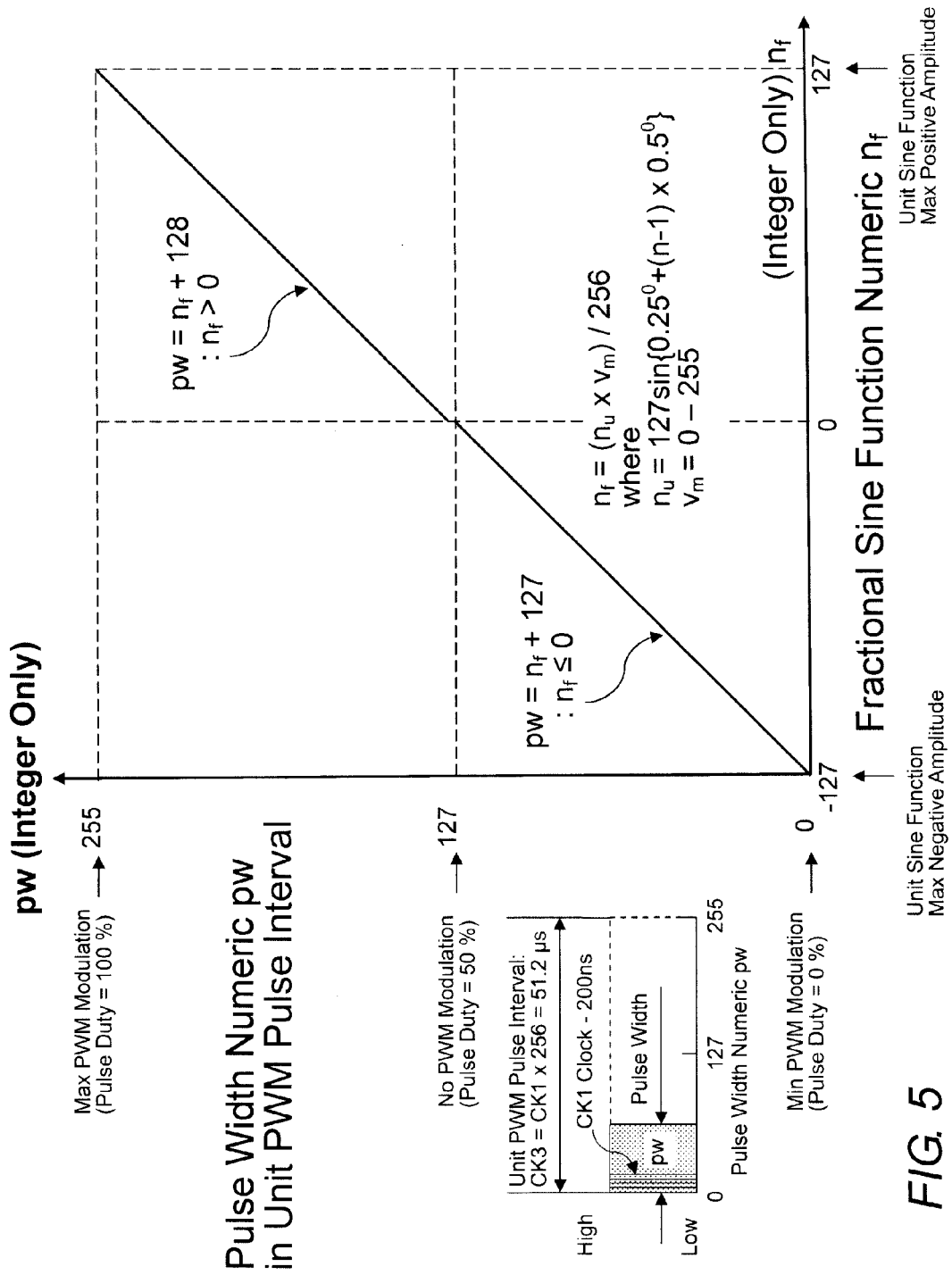
FIG. 5 is a functional relation graph between the pulse width numeric in the unit PWM pulse interval and the fractional sine function according to one embodiment.

FIG. 5 is a functional relation graph relating the pulse width numeric pw in the unit PWM pulse interval of approximately 51.2 μs to the fractional sine function numeric $n_f$ according to one embodiment. Only integers are employed in this relation for the machine calculations. By this exact numerical relation, the instantaneous amplitude of the fractional sine function $n_f$ can be translated into the pulse width numeric pw in real time every clock CK3 29 interrupt interval of approximately 51.2 μs.

FIG. 6 is a flow chart of a subprogram in which the machine frequency $f_m$ and the machine voltage $v_m$ are updated every CK5 31 interrupt period (approximately 3.6864 ms) in S62, S66, and S68 in the PCWM signal encoder 25 according to one embodiment. The acceleration-deceleration constant $k_{ad}$ and the frequency multiplication factor $k_{fmf}$ in S61 are input to the PCWM signal encoder 25 via the UART serial bus 02 at the power up and stored in a frequency increment register pair D R63 and E R64 where D R63 stores null and E R64 stores an actual constant, and in a frequency multiplication factor register F R65, respectively.

The acceleration-deceleration constant $k_{ad}$ can be selected outside by reflecting a ramp speed requirement for various motor drive operations. There are four ramp speed options to select. The frequency multiplication factor $k_{fmf}$ can also be selected outside by reflecting a maximum drive output frequency requirement for various motor drive applications. There are 31 maximum output frequency options to select for the gate drive and power transistor circuitry 08.

S62 shows that this subprogram is entered every CK5 31 interrupt period to check if the command frequency $f_c$ which is input via the UART serial bus 02 after the power up is equal to the machine frequency $f_m$ in S63. If the command frequency $f_c$ is equal to the machine frequency $f_m$, the subprogram goes to the exit. Otherwise an addition and subtraction routine in S64 is entered where a machine frequency register pair B R61 and C R62 are used along with the frequency increment register pair D R63 and E R64 for the machine frequency $f_m$ update. Both the frequency increment register pair D R63 and E R64 and the machine frequency register pair B R61 and C R62 comprise double precision registers which can hold decimal point numbers until the next CK5 31 interrupt period for an enhancement of frequency control accuracy.

When the command frequency $f_c$ is smaller than the machine frequency $f_m$, the content of frequency increment register E R64 is added to the content of machine frequency register C R62 first, followed by an addition of the content of frequency increment register D R63 and a Carry to the content of machine frequency register B R61. When the command frequency $f_c$ is larger than the machine frequency $f_m$, the content of frequency increment register E R64 is subtracted from the content of machine frequency register C R62 first, followed by a subtraction of the content of frequency increment register D R63 and a Carry from the content of machine frequency register B R61.

In S65 the subprogram goes to a unit sine function table scanning speed updating subprogram. The content of machine frequency register B R61 is now stored as an updated machine frequency $f_m$ in S66. In S67 the V/F function table 23 is entered using the updated machine frequency $f_m$ where an updated machine voltage $v_m$ is obtained and stored in a machine voltage register G R66 in S68 and the subprogram goes to exit.

FIG. 7 is a unit sine function table scanning speed updating subprogram in which a content of a sine table position increment register pair P R74 and Q R75 is updated every CK5 31 interrupt period (approximately 3.6864 ms) as shown in S62 and S75 in the PCWM signal encoder 25 according to one embodiment. The content of the machine frequency register pair B R61 and C R62 is loaded in a machine frequency holding register pair AH R71 and AL R72 in S71 and the content of the frequency multiplication factor register F R65, which contains $k_{fmf}$ is loaded in a frequency multiplication factor holding register X R73 in S72. Then in S73 a multiplication of A×X is carried out in which the upper 8 bits provides the integer portion and the lower 8 bits provides the decimal portion of the sine table position increment number per 2 interrupt intervals (approximately 102.4 μs).

When the above result is divided by 2 in S74, this now provides a sine table position increment number with the upper 8 bits for the integer portion and the lower 8 bits for the decimal portion per 1 interrupt interval (approximately 51.2 μs) corresponding to the unit PWM pulse interval. For example, if the content of the machine frequency register pair B R61 and C R62 is hff00 (=255: integer portion only) and the content of the frequency multiplication factor register F R65 is h09 (=9) the multiplication result is 255×9125612=4.4824. This is the sine table position increment number per CK3 29 interrupt period corresponding to the three sinusoidal motor drive signals 09 output frequency of approximately 121.6 Hz (=4.4824×1000000/51.2/720), where 4.4824×1000000/51.2 is the table position increment number per 1 second and 720 is the unit sine table length. In S75, the result obtained in S74 is loaded in the sine table position increment register pair P R74 and Q R75, and the subprogram goes to the exit.

FIG. 8 is a flow chart of a subprogram in which the unit sine function table position n is updated every CK3 29 interrupt period (approximately 51.2 μs) as shown in S81 and S82 in the PCWM signal encoder 25 according to one embodiment. An addition routine in S82 is entered where a unit sine function table position registers M R81, N R82, and L R83 are updated with the content of sine table position increment registers P R74 and Q R75. The unit sine function table position registers M R81, N R82, and L R83 and the sine table position increment register pair P R74 and Q R75 comprise double precision registers which can hold decimal point numbers until the next CK3 29 interrupt period for an enhancement of frequency control accuracy.

In S82 a content of the sine table position increment register Q R75 is added to a content of the sine function table position register L R83 first, followed by an addition of a content of the sine table position increment register P R74 and a Carry to a content of the unit sine function table position register pair M R81 and N R82. The content of the unit sine function table position register pair M R81 and N R82 now holds an updated sine table position number n as indicated in S83. Using the updated sine function table position number n in S84, the unit sine function numeric $n_u$ is fetched and stored in a unit sine function register H.

In S85 the PCWM signal encoding subprogram shown in FIG. 9 is called. In S86 the sine table position number n is incremented by 480 to advance the sine table position number n by 240°. The sine table position number n obtained in S86 is compared with 720 in S87, and if it does not exceed 720 the subprogram goes to S89. Otherwise the subprogram proceeds to S88 where 720 is subtracted from the sine table position number n just calculated in S86 to reset the sine table position number n. In S82, S86, and S88 the decimal numbers are held in registers Q R75 and L R83 until the next CK3 29 interrupt period for an enhancement of frequency control accuracy.

After S88, the subprogram goes to S89 where it is checked whether the three sinusoidal motor drive signals 09 generation is completed. If it is not completed, the subprogram goes back to S84 and repeats the process. If it is completed the subprogram goes to exit.

FIG. 9 is a PCWM signal encoding subprogram in which the PCWM numerics d 26 are generated every CK3 29 interrupt period (approximately 51.2 μs) as shown in S81 and S100 inside the PCWM signal encoder 25 according to one embodiment. In S90 the unit sine function numeric $n_u$ obtained in S84 and stored in a unit sine function register H R80 (see FIG. 8) is loaded in a unit sine function holding register A R91 as a multiplicand. Also in S91 the machine voltage $v_m$ obtained in S68 and held in the machine voltage register G R66 is loaded in a machine voltage holding register X R92 which becomes a multiplier.

The polarity of the unit sine function numeric $n_u$ is determined by checking the most significant bit of $n_u$ in S92. If it is zero or $n_u$ is positive, S93 is entered and the multiplication of A×X is performed. The upper 8 bits of the result are stored in a register A R93 and are modulated on period numeric for $n_u>0$. The lower 8 bits of the result are stored in a register X R94, which represents a decimal number of the multiplication, and is not used. In S94, h80 is added to the content of the register A R93, which becomes an overall on period numeric. In S95 the 1's complement of the content of the register A R93 in S94 is taken to get an overall off period numeric and the subprogram proceeds to S99.

If the most significant bit of the unit sine function numeric $n_u$ is 1 or $n_u$ is negative or zero, S96 is entered where the 1's complement of the content of the unit sine function holding register A R91 in S90 is taken to get an off period numeric for the unit sine function $n_u$. S97 performs the multiplication of A×X. The upper 8 bits of the result are stored in a register A R93 and are modulated off period numeric for $n_u<0$. The lower 8 bits of the result are stored in a register X R94, which represents a decimal number of the multiplication, and is not used. In S98, h80 is added to the content of the register A R93, which becomes an overall off period numeric and the subprogram proceeds to S99.

In S99, the content of the register A R93 is a PWM side modulation off period numeric 2d for the U upper 15, V upper 17, and W upper 19 arms, respectively. If $n_u>0$, the output is $0 \leq 2d<127$ and if $n_u<0$, $127 \leq 2d \leq 255$ will result. In S100, the content of the register A R93 in S99 is divided by 2 to get the PCWM numerics d 26, which comprises three PWM center modulation off period numerics for the U upper 15, V upper 17, and W upper 19 arms, respectively. The PCWM numerics d 26 are input to the PCWM signal decoder 27.

FIG. 10 is a time chart illustrating how the PCWM numerics d 26 generated in the PCWM signal encoder 25 in FIG. 9 are converted into a pulse width numeric in the unit PWM pulse interval in the PCWM signal decoder 27 according to one embodiment. The illustration shows both cases where the unit sine function $n_u$ is positive and negative or zero.

Let us examine now the $n_u>0$ case using a real numeric by referring to FIG. 9. Assume $n_u$=h3e (62) and $v_m$=h80 (128), where decimal numbers are shown inside the parentheses for ease of calculation. In S93, A×X=62×128=7936. Taking the upper 8 bits of multiplication results in 7936/256=h1f (31). In S94, adding h80 leads to h9f (159), which becomes h60 (96) after taking 1's complement in S95. In S99, 2d=96<127 is obtained. The output in S100 is thus d=h30 (48), which becomes the PWM center modulation off period numeric d for the upper arms, 15, 17, and 19 in the gate drive and power transistor circuitry 08.

Let us now examine the $n_u \leq 0$ case assuming $n_u$=hc1 (193) and $v_m$=h80 (128). In S96, taking 1's complement of hc1 (193) results in h3e (62). Then in S97, A×X=62×128=7936. Taking the upper 8 bits of multiplication leads to 7936/256=h1f (31). In S98, adding h80 becomes h9f (159). In S99, 2d=159>127 is obtained. The output in S100 is thus d=h4f (79), which becomes the PWM center modulation off period numeric d for the upper arms, 15, 17, and 19 in the gate drive and power transistor circuitry 08.

Figure 11:
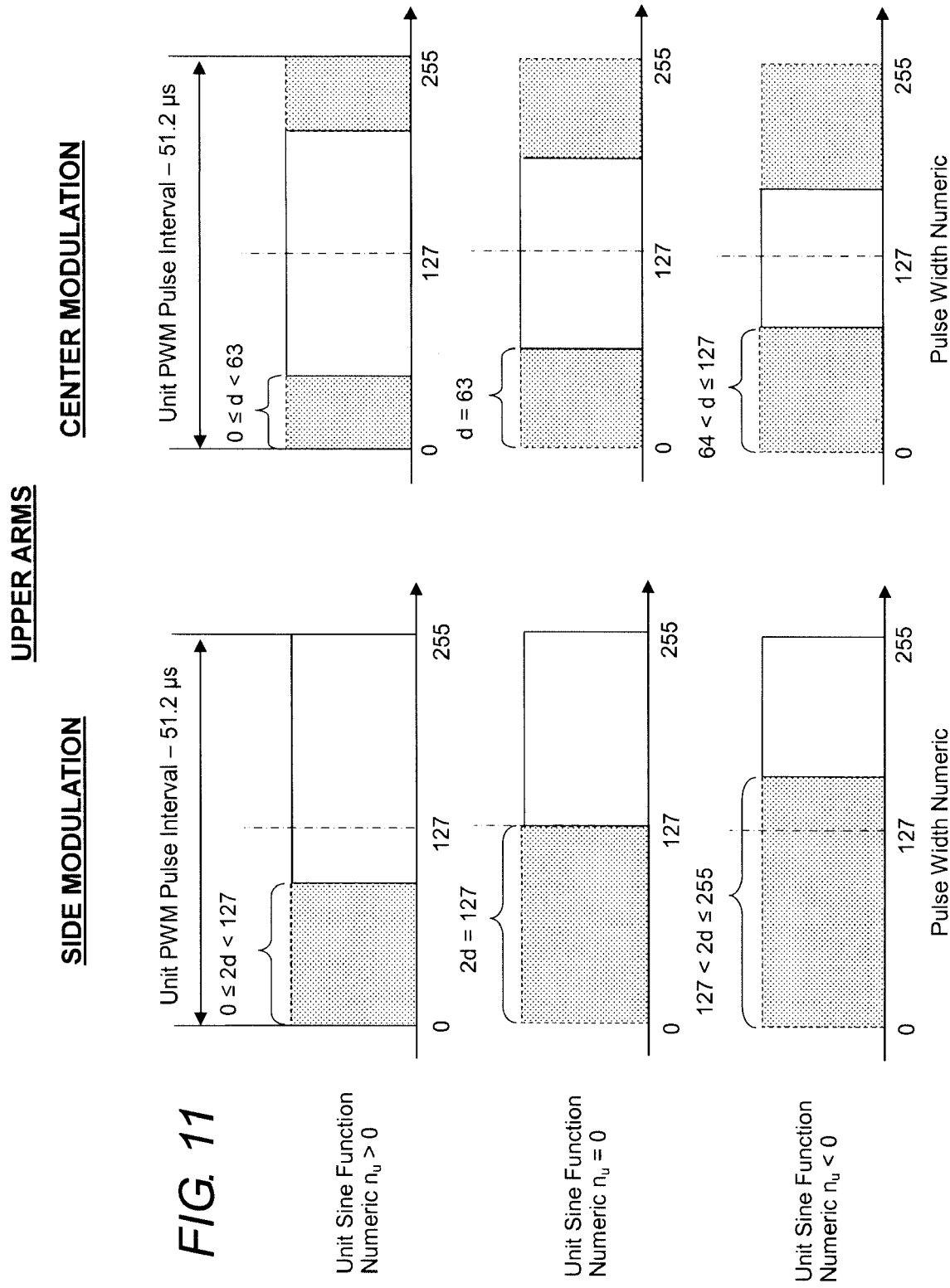
FIG. 11 is a comparison chart for the PCWM signal decoder output waveforms illustrating how the side modulation and the center modulation upper arms' signals look in the unit PWM pulse interval according to one embodiment.

FIG. 11 is a comparison chart for the PCWM signal decoder 27 output waveforms illustrating how the side modulation and the center modulation upper arms' signals look in the unit PWM pulse interval of approximately 51.2 μs according to one embodiment. The comparison is made for the unit sine function numeric $n_u$ positive, zero, and negative cases.

Figure 12:
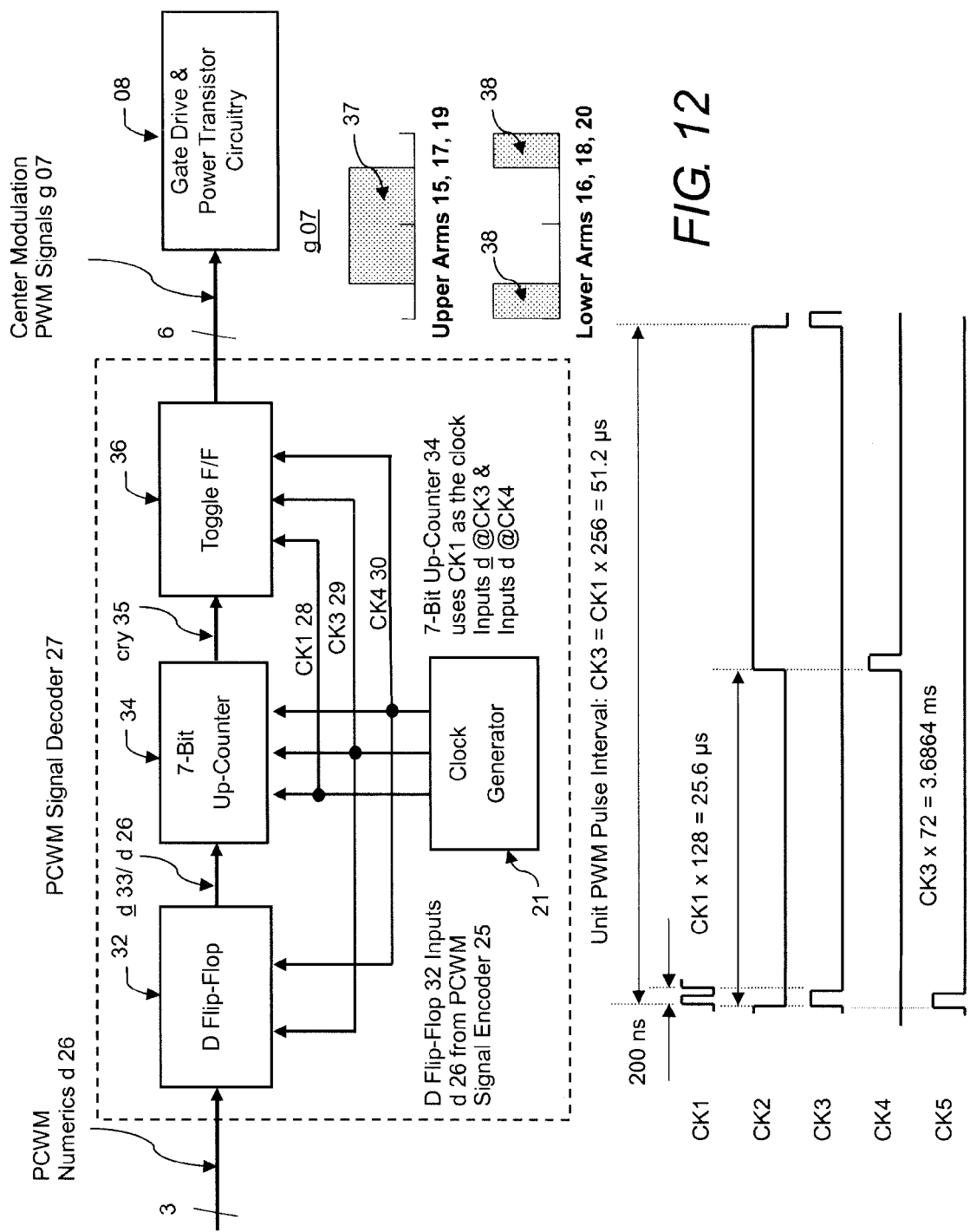
FIG. 12 is a block diagram showing the detailed inside of the PCWM signal decoder in the ASIC according to one embodiment.

FIG. 12 is a block diagram showing the detailed inside of the PCWM signal decoder 27 in the ASIC 06 according to one embodiment. The PCWM signal decoder 27 updates the center modulation PWM signals g 07 every CK3 29 interrupt period (approximately 51.2 μs). The center modulation PWM signals g 07 comprise three upper arms' output signals 37 to drive the upper arms 15, 17, and 19 and three lower arms' output signals 38 to drive the lower arms 16, 18, and 20, which are both located in the gate drive and power transistor circuitry 08.

Figure 13:
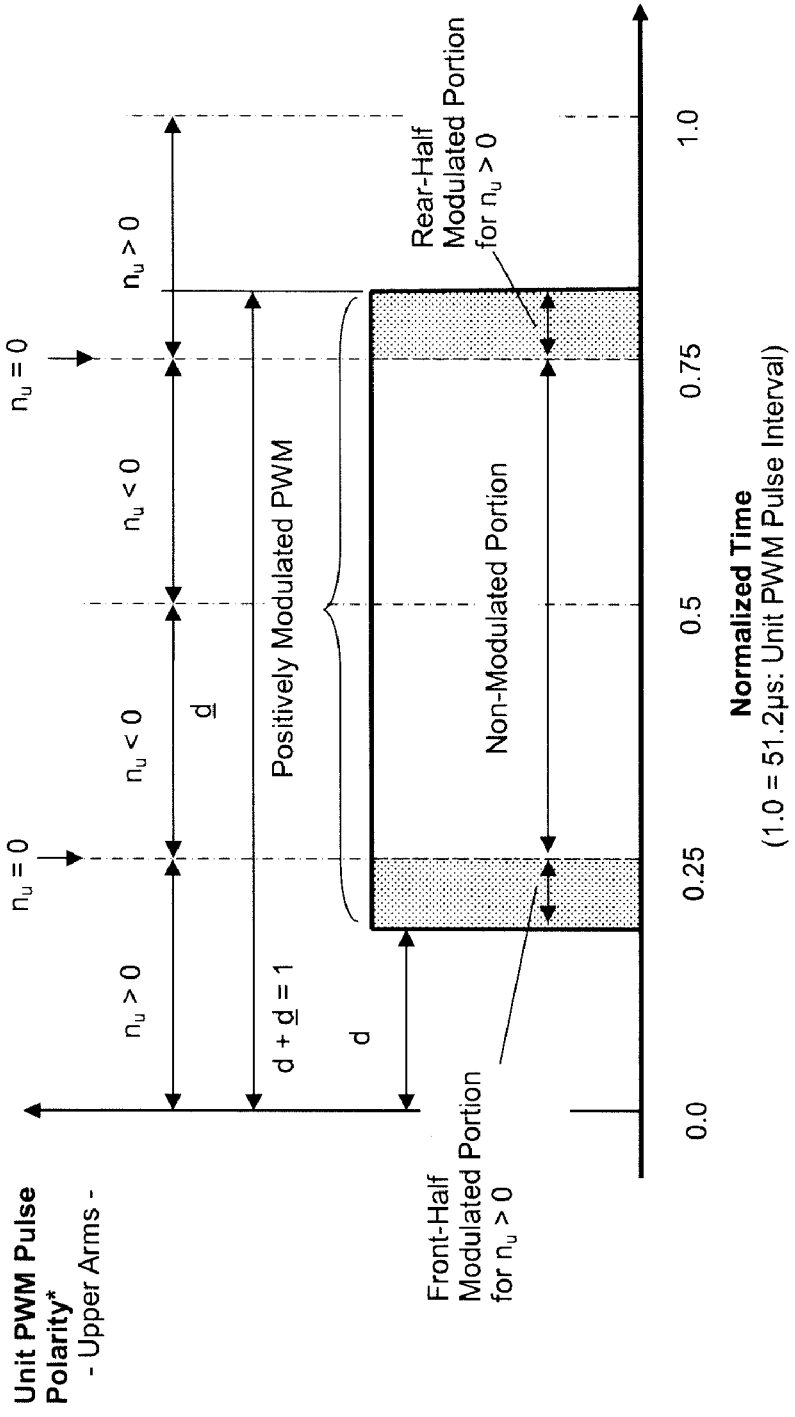
FIG. 13 illustrates an example of a unit PWM pulse polarity characteristic for the upper arms' signal when the unit sine function is positive as a function of normalized time in the unit PWM signal interval according to one embodiment.

During the past CK3 29 interrupt period, the PCWM signal decoder 27 receives the PCWM numerics d 26 from the PCWM signal encoder 25 and writes the data into a D Flip-Flop 32. The PCWM numerics d 26 represents the PWM center modulation leading-edge off period numeric for the upper arms 15, 17, and 19 in the gate drive and power transistor circuitry 08 as described in S100 of FIG. 9 and are shown in FIG. 13. The lower arms 16, 18, and 20 are provided their signals d̲ 33 from the opposite output terminal of a toggle flip-flop 36. A 7-bit up-counter 34 inputs d̲ 33 at CK3 29 and d 26 at CK4 30 clock signals and outputs a signal 35 when the counter reaches the full count of h7f.

The CK1 28 is used as the clock signal for the 7-bit up-counter 34 and the toggle flip-flop 36. For the 7-bit up-counter 34 the numeric d̲ 33 is loaded for the leading edge off period d 26 generation and the d 26 for the trailing edge d̲ 33 generation in the unit PWM pulse interval as depicted in FIG. 13. The 7-bit up-counter 34 loads 1's complementary numbers to generate the desired output.

The toggle flip-flop 36 reverses the output polarity every time when it receives the cry 35 signal from the 7-bit up-counter 34 and the clocks CK3 29 or CK4 30 from the clock generator 21, and generates the three upper arms' output signals 37 and the three lower arms' output signals 38. The polarities of the three lower arms' output signals 38 are opposite to the three upper arms' output signals 37. For the brevity of explanation, dead times between the upper and lower arms' signals 37 and 38 are omitted here. The center modulation PWM signals g 07 are thus generated and input to the gate drive and power transistor circuitry 08.

FIG. 13 shows an example of a unit PWM pulse polarity characteristic for the upper arms' signals when the unit sine function $n_u$ is positive as a function of the normalized time in the unit PWM signal interval according to one embodiment. As shown in the illustration, when the unit sine function $n_u$ is zero, there is no modulation and the pulse duty is 50% and d=0.25. When the unit sine function $n_u$ is positive, the pulse duty is more than 50% and d<0.25. When the unit sine function $n_u$ is negative, the pulse duty is less than 50% and d>0.25. Note that d+$\underline{d}$=1. The modulated signal portions are split into the front-half and rear-half portions.

Figure 14:
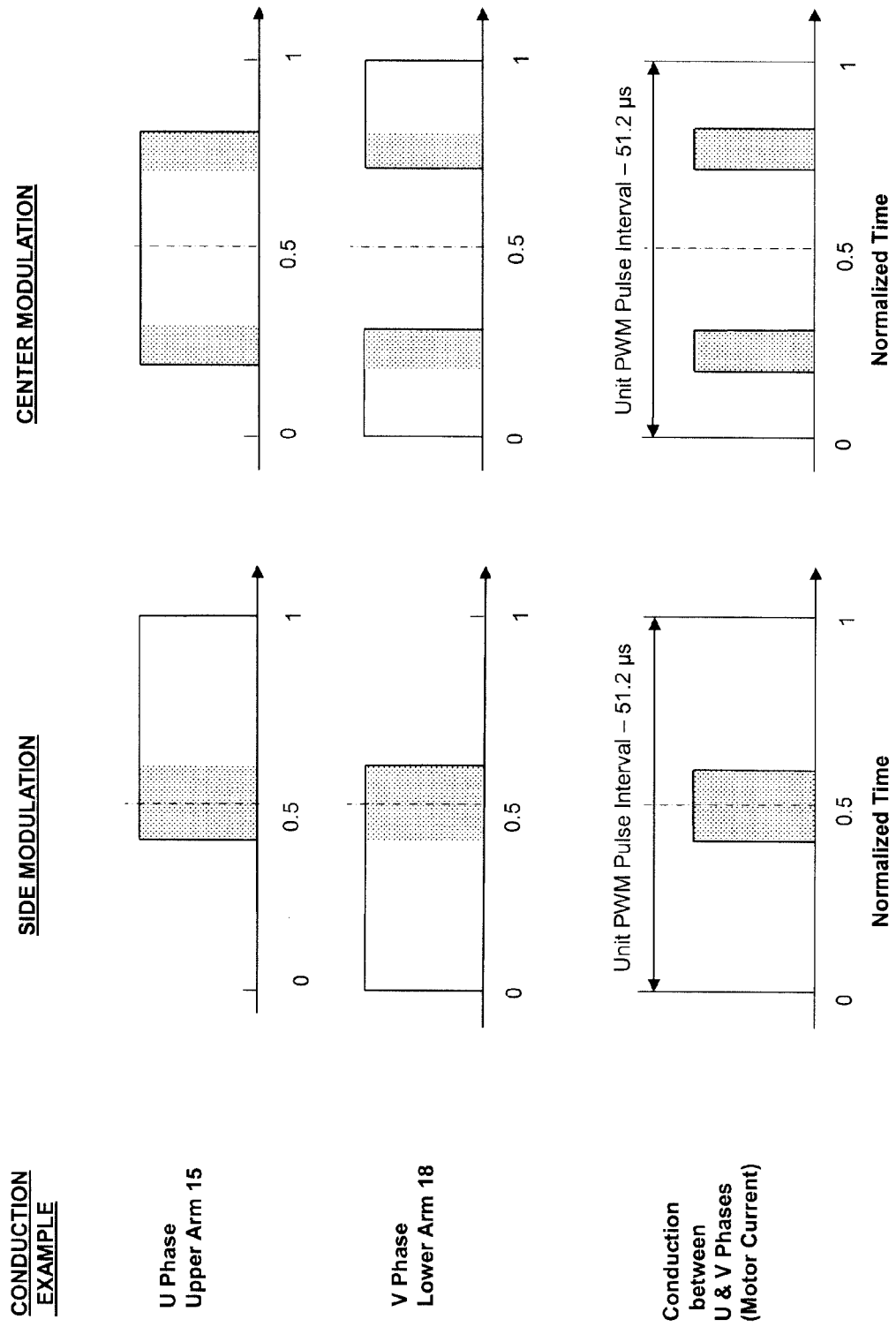
FIG. 14 is a comparison chart showing that the center modulation PWM can create a power transistors' inter-conduction twice per each unit PWM pulse interval compared to once for a side modulation PWM signal according to one embodiment.

FIG. 14 is a comparison chart showing that the center modulation PWM can create a power transistors' inter-conduction twice per each unit PWM pulse interval compared to once for the side modulation PWM signal according to one embodiment. The example chart shows the case where the U phase upper arm 15 and the V phase lower arm 18 are conducting.

Those having skill in the art will recognize that many changes may be made to the details of the above-described embodiments without departing from the underlying principles of the invention. The scope of the present invention should, therefore, be determined only by the following claims.

What is claimed is:

1. A motor drive system utilizing pulse code width modulation (PCWM) technology which can drive a three phase AC motor sinusoidally, comprising:
   (1) an AC to DC converter which supplies a DC bus voltage to a gate drive and power transistor circuitry;
   (2) a unit sine function table comprising a maximum amplitude sine function to provide a unit sine function numeric $n_u$ to a PCWM signal encoder upon receipt of a table address from said PCWM signal encoder;
   (3) a frequency to voltage (V/F) function table to output a machine voltage $v_m$ to said PCWM signal encoder after receiving a machine frequency $f_m$ from said PCWM signal encoder;
   (4) said PCWM signal encoder comprising a finite state machine to update said machine frequency $f_m$ and said machine voltage $v_m$ based on an acceleration-deceleration constant $k_{ad}$ and a command frequency $f_c$, and to provide PCWM numerics d to said PCWM signal decoder based on said unit sine function numeric $n_u$ using a frequency multiplication factor $k_{fmf}$;
   (5) said PCWM signal decoder comprising a serially connected D flip-flop, a 7-bit up-counter, and a toggle flip-flop to output center modulation pulse width modulation (PWM) signals g to said gate drive and power transistor circuitry based on said PCWM numerics d input from said PCWM signal encoder; and
   (6) said gate drive and power transistor circuitry to modulate said DC bus voltage corresponding to said center modulation PWM signals g output from said PCWM signal decoder, wherein said modulated DC bus voltage is for driving a three phase AC motor.

2. The motor drive system utilizing PCWM technology as claimed in claim 1, further comprising a DC to DC step-down chopper to receive said DC bus voltage for use by said gate drive and power transistor circuitry, and for use by an application specific integrated circuit (ASIC).

3. The motor drive system utilizing PCWM technology as claimed in claim 2, wherein said DC bus voltage is in a range between approximately 150 vdc and approximately 300 vdc, wherein said DC to DC step-down chopper converts said DC bus voltage to approximately 15 vdc and approximately 5 vdc to supply to said gate drive and power circuitry, and wherein said DC to DC step-down chopper converts said DC bus voltage to approximately 3.3 vdc to supply to said ASIC.

4. The motor drive system utilizing PCWM technology as claimed in claim 2, wherein said ASIC comprises:
   a clock generator;
   said unit sine function table;
   said V/F function table;
   said PCWM signal encoder; and
   said PCWM signal decoder.

5. The motor drive system utilizing PCWM technology as claimed in claim 4, wherein said clock generator supplies clock signals CK1, CK3, and CK5 to said PCWM signal encoder and clock signals CK1, CK3, and CK4 to said PCWM signal decoder.

6. The motor drive system utilizing PCWM technology as claimed in claim 5, wherein said PCWM signal encoder is further configured to:
   externally receive said acceleration-deceleration constant $k_{ad}$ at a time of power up;
   externally receive said frequency multiplication factor $k_{fmf}$ at said time of power up;
   externally receive said command frequency $f_c$ after said time of power up every said CK5 clock period;
   update said machine frequency $f_m$ and said machine voltage $v_m$ every CK5 clock period; and
   provide a plurality of said PCWM numerics d to said PCWM signal decoder every said CK3 clock period.

7. The motor drive system utilizing PCWM technology as claimed in claim 6,
   wherein said PCWM signal encoder provides PCWM numerics d to said PCWM signal decoder,
   wherein said PCWM signal decoder outputs a plurality of center modulation PWM signals g to said gate drive and power transistor circuitry, and
   wherein said gate drive and power transistor circuitry comprises U upper and U lower arms, V upper and V lower arms, and W upper and W lower arms, each connected in tandem to modulate said DC bus voltage, thereby applying three sinusoidal motor drive signals U, V, and W to said three phase AC motor.

8. The motor drive system utilizing PCWM technology as claimed in claim 5, wherein said PCWM signal encoder is further configured to update said machine frequency $f_m$ and said machine voltage $v_m$ every said CK5 clock interrupt period, wherein said acceleration-deceleration constant $k_{ad}$ is externally received at said time of power up and held in a frequency increment register pair DE, wherein said frequency multiplication factor is externally received at said time of power up and held in a frequency multiplication register F, wherein said command frequency $f_c$ is externally received after said time of power up, and wherein said PCWM signal encoder comprises:
   (1) a comparator to check if said command frequency $f_c$ is equal to said machine frequency $f_m$, and if $f_c$=$f_m$ exit from an updating of said machine frequency $f_m$, otherwise continue said updating of said machine frequency $f_m$;
   (2) a machine frequency register pair BC to store a machine frequency numeric;
   (3) an addition and subtraction component to increment or decrement a content of said frequency register pair BC with a content of said frequency increment register pair DE to update a content of said machine frequency register pair BC, in which said machine frequency $f_m$ is said content of said register B;
   (4) a multiplication component to multiply said content of said machine frequency register pair BC by a content of said frequency multiplication register F and divide a multiplication result by two to obtain a sine table position increment numeric, which is loaded in a sine table position increment register pair PQ for use in updating a unit sine function table scanning speed;

(5) said V/F function table to output a machine voltage $v_m$ corresponding to said machine frequency $f_m$; and (6) a machine voltage register G to store said machine voltage $v_m$ used for generating a plurality of PCWM numerics d as an input to said PCWM signal decoder.

9. The motor drive system as claimed in claim 8, wherein said acceleration-deceleration constant $k_{ad}$ is configured to be selected outside by reflecting a ramp speed requirement for various motor drive operations.

10. The motor drive system as claimed in claim 8, wherein said machine frequency register pair BC, said frequency increment register pair DE, and said sine table position increment register pair PQ comprise double precision registers configured to hold decimal point numbers until a next CK5 interrupt period for a finer frequency control.

11. The motor drive system as claimed in claim 5, wherein said PCWM signal encoder is further configured to update a unit sine function table position number n and consequently provide said PCWM numerics d to said PCWM signal decoder every said CK3 clock interrupt period allowing to change a unit sine function table scanning speed, thereby changing an output frequency of said motor drive, further comprising:

(1) a unit sine function register H to hold a unit sine function numeric $n_u$ from said unit sine function table;

(2) a machine voltage register G to hold said machine voltage $v_m$ from said V/F function table;

(3) unit sine function table position registers MNL to hold a unit sine function table position numeric;

(4) a sine table position increment register pair PQ to hold a sine table position increment number from a previous CK5 interrupt period;

(5) a first addition component to increment a content of said unit sine function table position registers MNL with a content of said sine table position increment register pair PQ with a carry to obtain updated said unit sine function table position numeric in which said content of registers MN is a unit sine function table position number n;

(6) said unit sine function table to obtain said unit sine function numeric $n_u$ by inputting said unit sine function table position number n and stored in said unit sine function register H;

(7) a unit sine function table scanning speed updating subprogram;

(8) a second addition component to increment said unit sine function table position number n stored in said unit sine function table position registers MN by 480 which is equivalent to 240° phase angle to obtain another phase of said unit sine function numeric $n_u$ which is repeated three times to complete three phases of said unit sine function table position numeric updating;

(9) a first comparator to compare said content of said unit sine function table position registers MN with a unit sine table length of 720;

(10) a subtraction component to subtract said unit sine table length of 720 from said content of said unit sine function table position registers MN when said sine table position number n exceeds said unit sine table length of 720 to reset said sine table position number n; and

(11) a second comparator to determine if said three phases of said unit sine function table position numeric updating is completed.

12. The motor drive system as claimed in claim 11, wherein said frequency multiplication factor $k_{fmf}$ is configured to be programmed outside by reflecting a maximum output frequency requirement for various motor drive applications.

13. The motor drive system as claimed in claim 11, wherein said machine frequency register pair BC, said unit sine function table position registers MNL and said sine table position increment register pair PQ comprise double precision registers with decimal point numbers for a finer frequency control.

14. The motor drive system as claimed in claim 5, wherein said PCWM signal encoder is further configured to translate an instantaneous amplitude of said unit sine function numeric $n_u$ into said PCWM numerics d in a unit PWM pulse interval every said CK3 clock interrupt period, thereby changing an output voltage of said motor drive, further comprising:

(1) a unit sine function register H to hold a unit sine function numeric $n_u$ from said unit sine function table;

(2) a machine voltage register G to hold said machine voltage $v_m$ from said V/F function table;

(3) a comparator to determine whether said unit sine function numeric $n_u$ is positive;

(4) a multiplication component to multiply a content of said unit sine function register H by a content of said machine voltage register G if said unit sine function numeric $n_u$ is positive, otherwise to multiply after taking a one's compliment of said content of said unit sine function register H;

(5) a fractional sine function register A to hold an absolute number of said fractional sine function numeric $n_f$ which is an upper 8 bits from a multiplication result of said multiplication component;

(6) an addition component to add an h80 to a content of said fractional sine function register A and to take a one's compliment of a result of said addition component if said unit sine function numeric $n_u$ is positive, otherwise to do nothing with said result of said addition component;

(7) a PWM side modulation off period numeric 2d from said result of said addition component; and (8) a division component to divide said PWM side modulation off period numeric 2d by two to get a PWM center modulation off period numeric d as an input to said PCWM signal decoder.

15. The motor drive system as claimed in claim 14, wherein said multiplication component and said addition component are configured to convert said instantaneous amplitude of said fractional sine function numeric $n_f$ with the magnitude of −127 to 127 into said pulse width numeric pw with the magnitude of 0 to 255 in said unit PWM pulse interval.

16. The motor drive system utilizing PCWM technology as claimed in claim 5, wherein said PCWM signal encoder is configured to provide three PCWM numerics d to said PCWM signal decoder, wherein said PCWM signal decoder is configured to generate six center modulation PWM signals g, and wherein:

(1) said three PCWM numerics d from said PCWM signal encoder represent three phase motor drive encoded signals;

(2) said clock generator supplies said clock signal CK1 to said 7-bit up-counter and said toggle flip-flop, supplies said clock signal CK3 to said D flip-flop, said 7-bit up-counter, and said toggle flip-flop to generate a leading-edge load signal, and supplies said clock signal CK4 to said D flip-flop, said 7-bit up-counter, and said toggle flip-flop to generate a mid-point load signal;

(3) said D flip-flop, which stores said three PCWM numerics d input from said PCWM signal encoder, provides said 7-bit up-counter with a one's compliment data d of said stored data d upon receipt of said leading-edge load signal CK3, and with said stored data d upon receipt of said mid-point load data CK4;

(4) said 7-bit up-counter with said clock signal CK1 outputs two carry signals cry to said toggle flip-flop when a content of said 7-bit up-counter is full, once to generate a front-half PWM polarity switch signal before said mid-point, and then a rear-half PWM polarity switch signal after said mid-point; and (5) said toggle flip-flop changes an output signal polarity by receiving said two carry signals cry from said 7-bit up-counter with said clock signal CK1 of which output constitutes each of six different said center modulation PWM signals g in time train representing decoded three phase upper and lower channel inputs to said gate drive and transistor circuitry.

17. The motor drive system as claimed in claim 16, wherein said center modulation PWM signal g is configured to create a power transistors' inter-conduction twice per each unit PWM pulse interval compared to once for a side modulation PWM signal, allowing a finer current wave form which results in smoother motor drive.

18. A method for using pulse code width modulation (PCWM) technology to drive a three phase AC motor sinusoidally, the method comprising:

retrieving a unit sine function numeric $n_u$ from a unit sine function table based on a unit sine function table position number n, said unit sine function table comprising a maximum amplitude sine function;

retrieving a machine voltage $v_m$ from a frequency to voltage (V/F) function table based on a machine frequency $f_m$;

periodically updating said machine frequency $f_m$ and said machine voltage $v_m$ based on an acceleration-deceleration constant $k_{ad}$ and a command frequency $f_c$;

generating a plurality of PCWM numerics d based on said unit sine function numeric $n_u$ using a frequency multiplication factor $k_{fmf}$ and said machine voltage $v_m$;

generating a plurality of center modulation pulse width modulation (PWM) signals g based on said plurality of PCWM numerics d; and modulating a DC bus voltage corresponding to said plurality of center modulation PWM signals g so as to drive a three phase AC motor.

19. A motor drive system comprising:

means for retrieving a unit sine function numeric $n_u$ from a unit sine function table based on a unit sine function table position number n, said unit sine function table comprising a maximum amplitude sine function;

means for retrieving a machine voltage $v_m$ from a frequency to voltage (V/F) function table based on a machine frequency $f_m$;

means for generating a plurality of PCWM numerics d based on said unit sine function numeric $n_u$ using a frequency multiplication factor $k_{fmf}$ and said machine voltage $v_m$;

means for generating a plurality of center modulation pulse width modulation (PWM) signals g based on said plurality of PCWM numerics d; and means for modulating a DC bus voltage corresponding to said plurality of center modulation PWM signals g so as to drive a three phase AC motor.

* * * * *